(12) United States Patent
Bodenstorfer

(10) Patent No.: US 7,287,973 B2
(45) Date of Patent: Oct. 30, 2007

(54) DOUGH DIVIDING MACHINE

(75) Inventor: Ferdinand Bodenstorfer, Vienna (AT)

(73) Assignee: Werner & Plfeiderer Lebensmitteltechnik GmbH, Dinkelsbuhl (DE)

( * ) Notice: Subject to any disclaimer, the term of this patent is extended or adjusted under 35 U.S.C. 154(b) by 569 days.

(21) Appl. No.: 10/487,642

(22) PCT Filed: Aug. 24, 2002

(86) PCT No.: PCT/EP02/09488

§ 371 (c)(1),
(2), (4) Date: Feb. 25, 2004

(87) PCT Pub. No.: WO03/022057

PCT Pub. Date: Mar. 20, 2003

(65) Prior Publication Data

US 2004/0258819 A1 Dec. 23, 2004

(30) Foreign Application Priority Data

Sep. 10, 2001 (DE) ................................ 101 44 546

(51) Int. Cl.
*A21D 6/00* (2006.01)
(52) U.S. Cl. ...................................... 425/238; 425/183
(58) Field of Classification Search ................ 425/238, 425/183
See application file for complete search history.

(56) References Cited

U.S. PATENT DOCUMENTS 4,869,653 A * 9/1989 Powers et al. ............... 417/339
4,984,978 A * 1/1991 Beatty ......................... 425/185
5,211,968 A * 5/1993 Judex ......................... 425/238

FOREIGN PATENT DOCUMENTS

| DE | 31 23 200 | 3/1982 |
|---|---|---|
| DE | 3123200 A1 * | 3/1982 |
| DE | 3436258 A1 * | 4/1986 |
| DE | 44 08 023 | 9/1995 |
| EP | 0 567 730 | 11/1993 |
| GB | 723 768 | 2/1955 |

* cited by examiner

*Primary Examiner*—Robert B. Davis
*Assistant Examiner*—Marissa W Chaet
(74) *Attorney, Agent, or Firm*—Browdy and Neimark, PLLC

(57) ABSTRACT

A dough divider comprises a machine housing (3); a dough collecting container (4) which is mounted on the machine housing (3), receiving dough that is to be metered; a dough delivery arrangement which is connected to the dough collecting container (4), comprising a driven dough delivery piston (15) for the delivery of dough from the dough collecting container (4); and a dough metering arrangement, which comprises a first row of first measuring pistons (40), which are driven for displacement in first piston casings (42), taking dough from the dough delivery arrangement, and at least a second row of second measuring pistons (41), which are driven for displacement in second piston casings (43), taking dough from the dough delivery arrangement, with the first piston casings (42) having a cross-sectional area $A_1$ and the second piston casings (43) having a cross-sectional area $A_2$ so that $A_1$ differs from $A_2$, the dough metering arrangement being displaceable such that dough from the at least one delivery piston (15) is deliverable alternatively to the first piston casings (42) or the at least second piston casings (43); and a dough discharge arrangement for receiving and discharging metered dough from the dough metering arrangement.

9 Claims, 6 Drawing Sheets

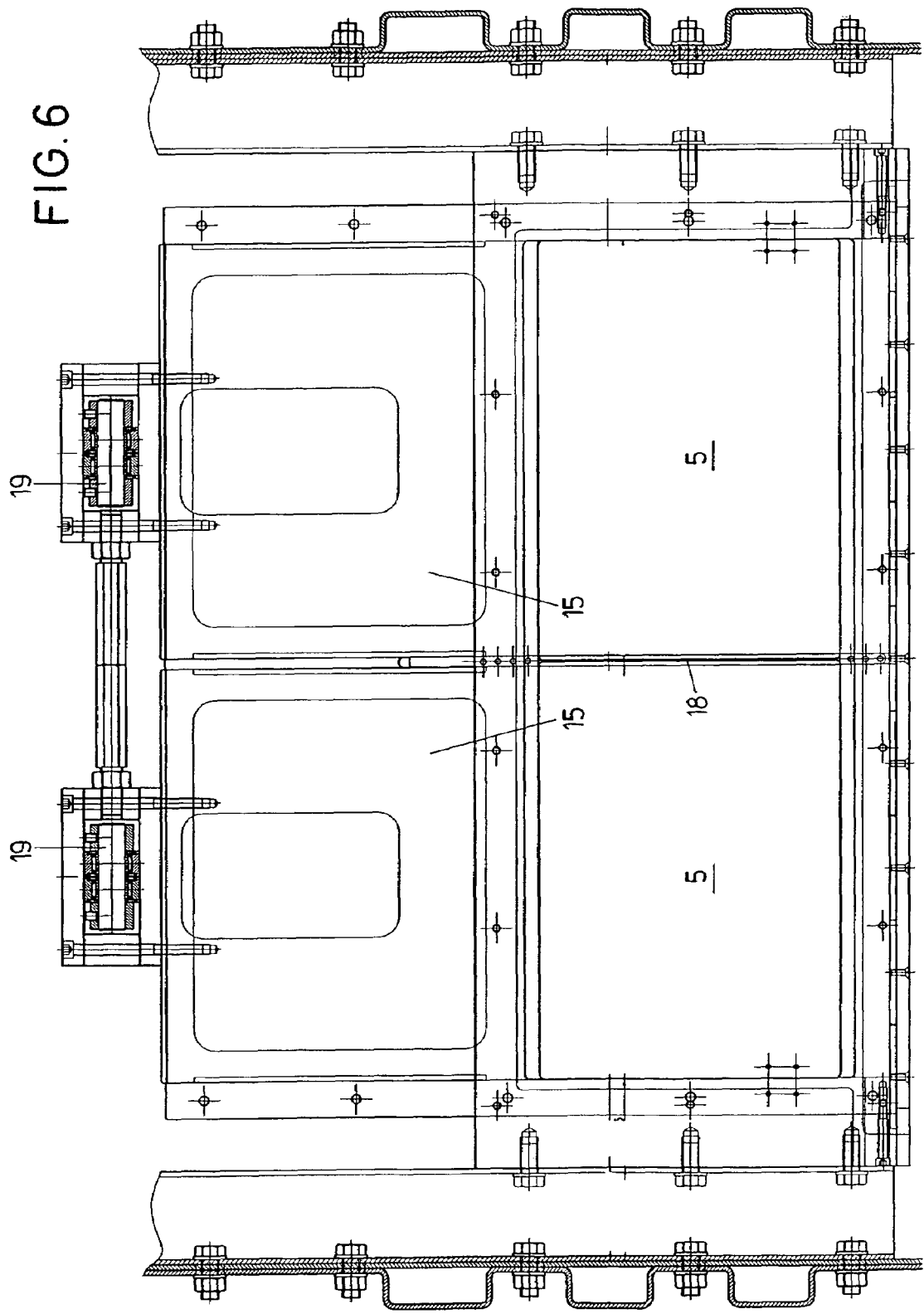

DOUGH DIVIDING MACHINE

BACKGROUND OF THE INVENTION

1. Technical Field

The invention relates to a dough divider.

2. Prior Art

Dough dividers for bakery dough portioning have been known for quite a while. Special difficulties occur whenever a dough divider is used for metering dough pieces of varying size.

OBJECT AND SUMMARY OF THE INVENTION

It is an object of the invention to embody a dough divider by which easily to meter dough portions of varying size.

The gist of the invention resides in that several, in particular two, rows of piston casings are provided one on top of the other, which are selectively filled with dough. In this way, smaller or bigger dough pieces can be produced on the same machine. Fine dosing of dough takes place by modification of the depth of insertion of the respective measuring piston into the associated piston casing.

Further embodiments of the invention will become apparent from the sub-claims.

BRIEF DESCRIPTION OF THE DRAWINGS

Additional features and details of the invention will become apparent from the ensuing description of an exemplary embodiment, taken in conjunction with the drawing, in which

FIG. 6 is a plan view in accordance with the arrow VI of FIG. 1.

DETAILED DESCRIPTION OF THE PREFERRED EMBODIMENT(S) OF THE INVENTION

Figure 1:
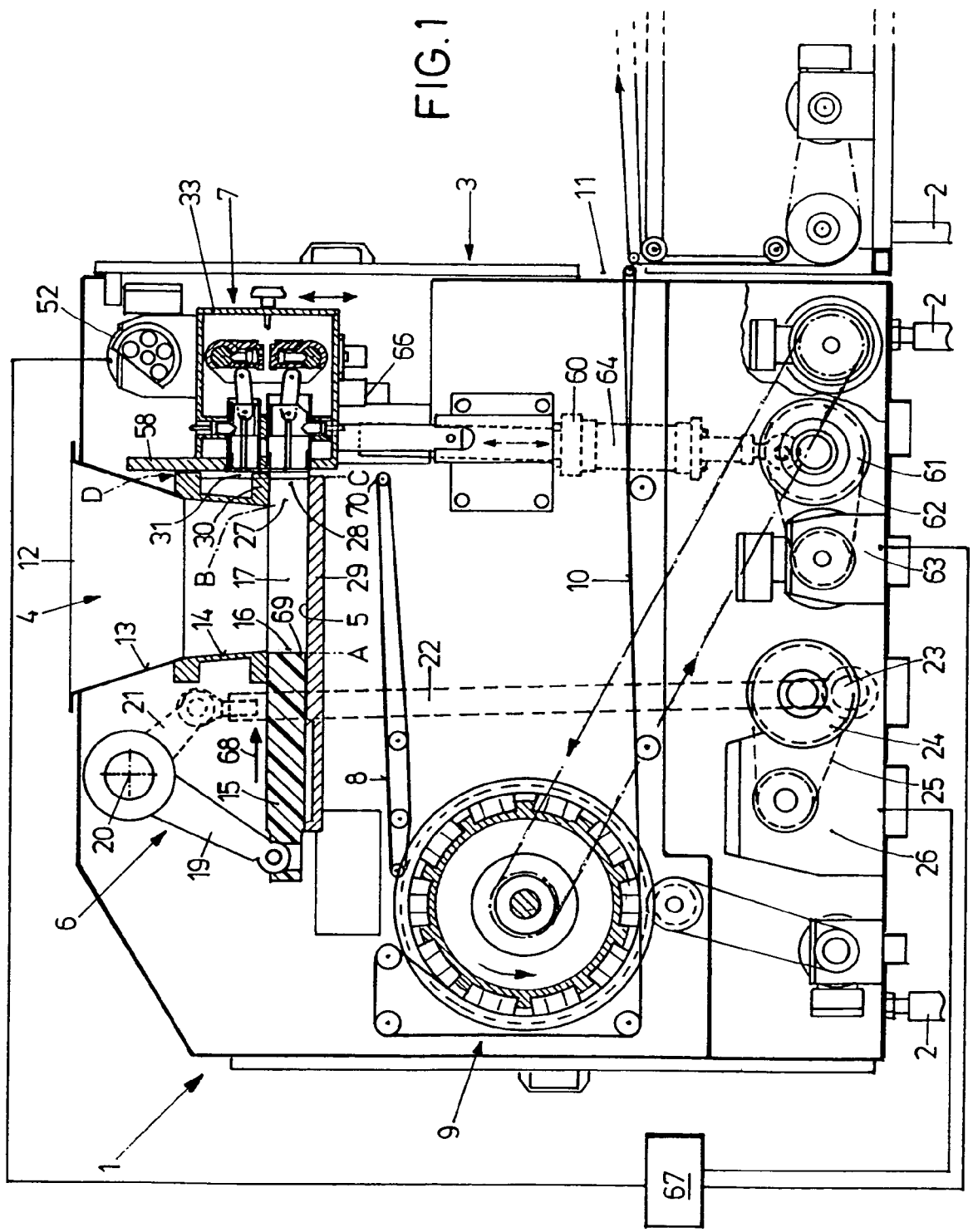
FIG. 1 is a vertical sectional view of a dough divider according to the invention with a dough metering arrangement.

A dough divider 1 comprises a machine housing 3 which supports itself on legs 2. In the upper area of the housing 3, provision is made for an externally open hopper 4 with a bottom 5. In vicinity to the hopper 4, a dough delivery arrangement 6 is disposed on one side. On the opposite side of the hopper 4, provision is made for a dough metering arrangement 7 which is vertically displaceable. A conveyor belt 8 is disposed underneath the hopper bottom 5, connecting the dough metering arrangement 7 with a kneader in a manner known per se. A discharge belt 10 is arranged at the bottom end of the kneader 9, mouthing into a lateral opening 11 of the housing 3.

The hopper 4 has an externally open charging hole 12. It is comprised of a top hopper section 13 and a bottom hopper section 14 in the form of a cast part, both of which taper downwards conically. The hopper 4 is completed downwards by the bottom 5. The dough delivery arrangement 6 comprises two cuboid pistons 15 which are insertable, through an opening 16 on the left of the hopper bottom 5 in FIG. 1, from an external position A seen in FIG. 1 into the bottom space 17. The pistons 15 are made of plastic material. The pistons 15 are separated from each other by a dividing wall 18 which is joined to the hopper bottom 5, having approximately the height of the piston 15 and simultaneously serving as a guide. The dividing wall 18 ends short of the right end of the channels 28 in FIG. 1, in particular 5 mm short of it. By their extreme ends—on the left in FIG. 1—the pistons 15 are articulated to a lever 19 which is mounted for pivoting about a pivot axis 20. The lever 19 is connected to a second lever arm 21 which is displaced by approximately 90°, the free end thereof being articulated to a driving rod 22. The opposite end 23 of the driving rod 22 is articulated to a cam disk 24 which is drivable by a motor 26 via a belt drive 25.

At the right end in FIG. 1, of the bottom space 17, provision is made for an opening 27, the contour of which corresponds to the piston 15; the opening 27 is adjoined by a horizontal dough channel 28. The channel 28 is defined downwards by the bottom plate 29 of the hopper bottom 5. The channel is defined upwards by a ceiling 30, the bottom hopper section 14 and the ceiling 30 forming a single piece. A vertical sealing plate 31 of plastic material is mounted on the—in FIG. 1—right end of the dough channel 28; it is tightly joined to the bottom plate 29 and the bottom hopper section 14. The sealing plate 31 comprises an opening 32 which is in alignment with the dough channel 28.

Figure 2:
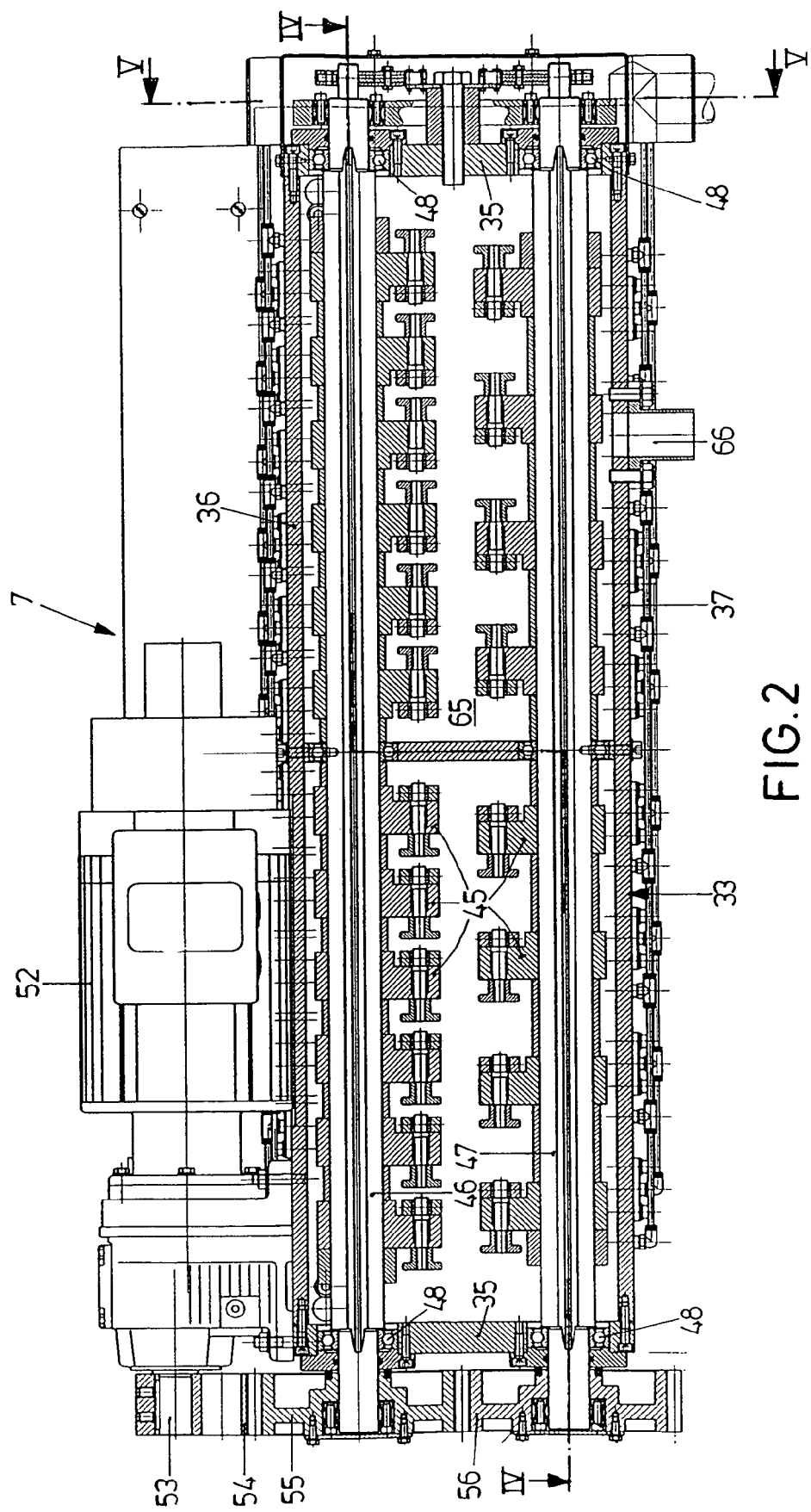
FIG. 2 is a vertical sectional view of the dough metering arrangement according to claim 1.
Figure 3:
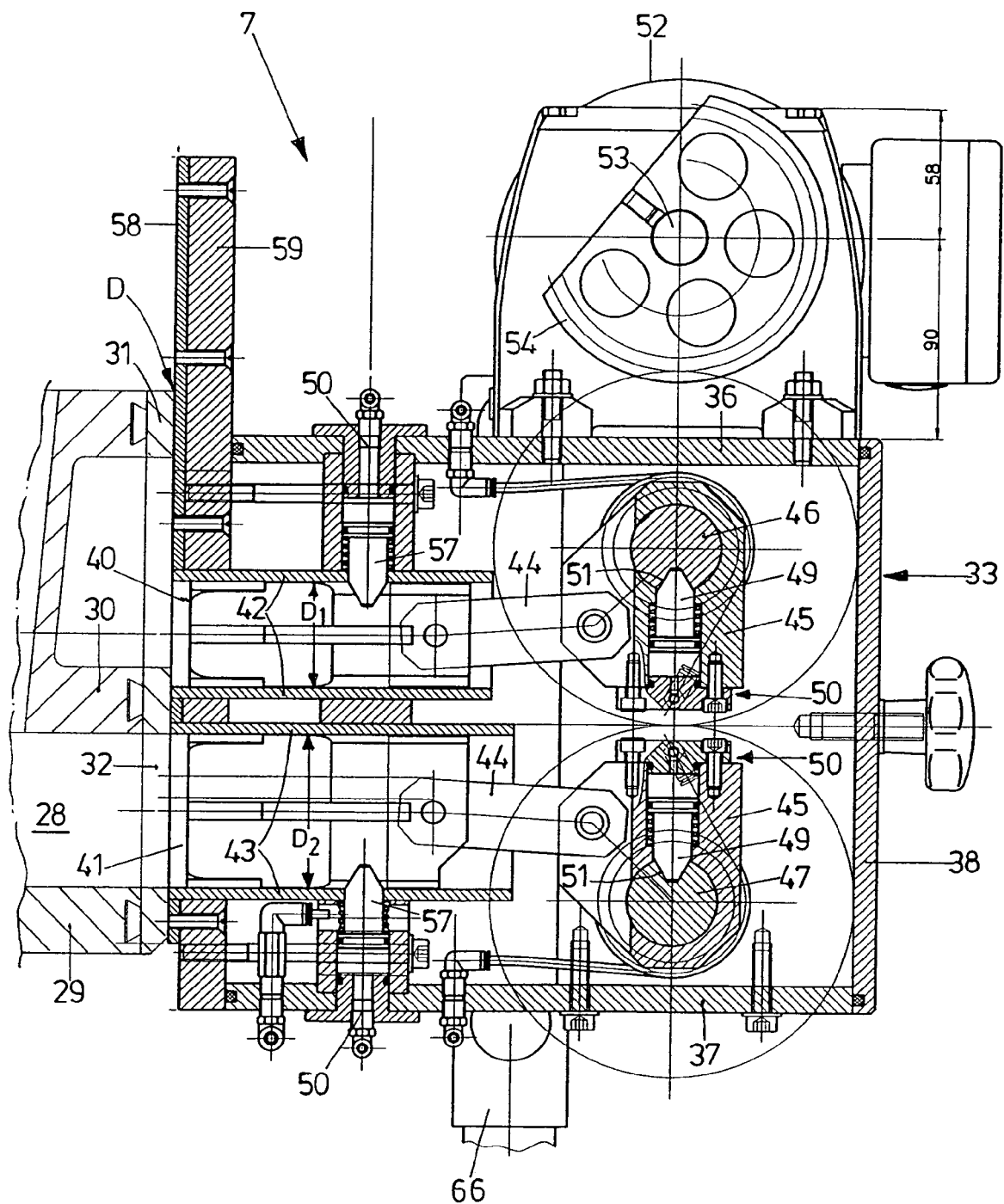
FIG. 3 is a vertical sectional view of the dough metering arrangement according to FIG. 1.
Figure 4:
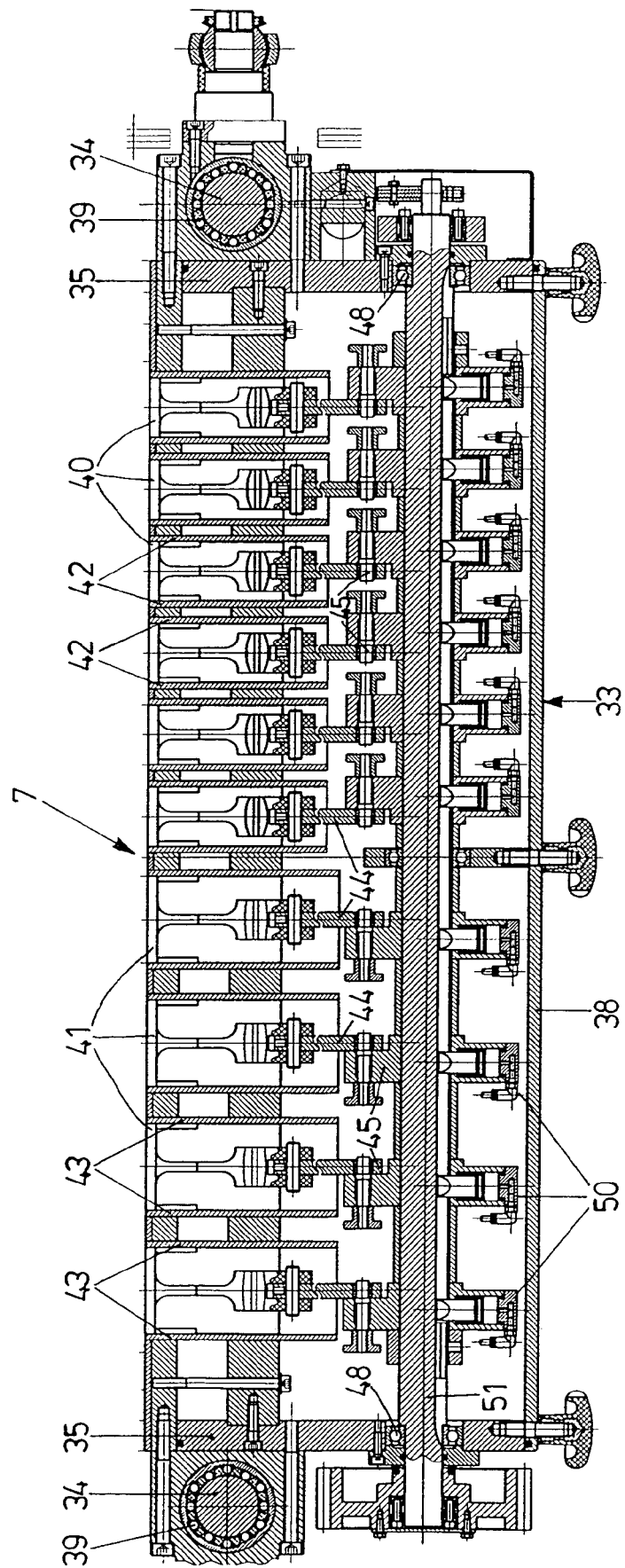
FIG. 4 is a displaced horizontal sectional view of the dough metering arrangement according to FIG. 1.
Figure 5:
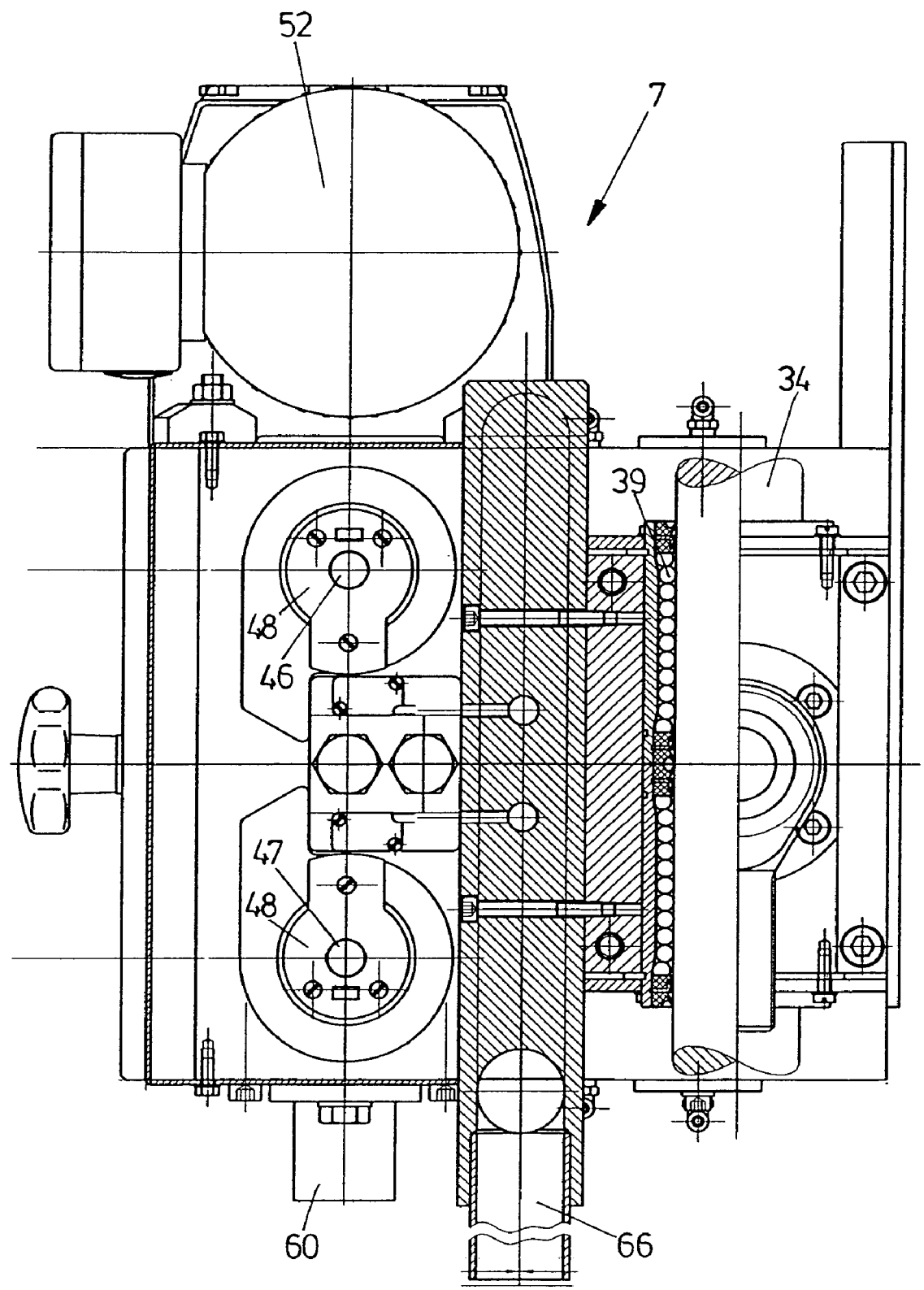
FIG. 5 is a sectional view on the line V-V of FIG. 2.

The dough metering arrangement 7 is disposed before the sealing plate 31. It comprises a casing 33 which is guided for vertical displacement by way of two vertical guide rods 34 that are connected to the machine housing 3. The casing 33 is comprised of opposite side walls 35 which are joined to each other via a top longitudinal wall 36, a bottom longitudinal wall 37 and a right longitudinal wall 38. On the outside of the side walls 35, a bearing 39 is mounted, in which is guided a respective guide rod 34. A top row of horizontal measuring pistons 40 and a row, disposed underneath, of equally horizontal measuring pistons 41 are disposed in the casing 33. Several measuring pistons 40 and 41 of the same type are disposed side by side in a row. In the present case, eight measuring pistons 40 are disposed in a row and another eight measuring pistons 41 are disposed underneath. The measuring pistons 40 and 41 are displaceably guided in corresponding annular cylindrical piston casings 42 and 43. The diameter of the piston casing 42 amounts to $D_1$. The diameter of the piston casing 43 is $D_2$, with $D_1 < D_2$, in particular $D_2/D_1 \approx 1.5$ applying. Consequently, the cross-sectional areas $A_1$ and $A_2$ of the piston casings 42 and 43 differ. A connecting rod 44 is articulated to the rear end of each piston 40 and 41, the other end of the connecting rod 44 being connected, via an entrainer 45, to a drive shaft 46 and 47. The lengthwise ends of the shafts 46 and 47 are run on bearings 48. Each entrainer 45 is rotatably mounted on the shaft 46 and 47, having an arresting pin 49 which is displaceably guided and, by means of a pneumatic locking unit 50, engageable with a longitudinal groove 51 of the shaft 46 and 47. If the arresting pin 49 is in engagement with the longitudinal groove 51, the entrainer 45 is connected to the shaft 46 and 47 for torque transmission. A servomotor 52 is fixed to the longitudinal wall 36, the shaft 53 of which is connected to a pinion 54. At their left end in FIG. 2, the shafts 46 and 47 have gearwheels 55 and 56, the gearwheel 55 being in engagement with the pinion 54 and the gearwheel 55 being in engagement with the gearwheel 56 so that the motor 52 drives both shafts simultaneously and in an opposite direction. The measuring pistons 40 and 41 are lockable in the casings 42 and 43 by means of arresting pins 57 that are pneumatically insertable into the interior of the casings. Above the top row of measuring pistons 40, a vertical, stainless steel cutter plate 58 is connected to the casing 33, extending over the full width of the arrangement 7. The cutter plate 58 is screwed to a bearing plate 59 that is connected with the casing 33; it is in alignment with the outer ends of the piston casings 42 and 43.

The casing 33 is articulated by the bottom side to a telescopic rod 60. The opposite bottom end of the telescopic rod 60 is articulated to a cam disk 61 which is joined, via a belt drive 62, to a motor 63. The telescopic rod 60 comprises a piston-cylinder unit 64 by which to modify the length of the telescopic rod 60. At the bottom end of the casing 33, provision is made for a connecting sleeve 66 which is connected to the internal space 65 of the casing and to a suction arrangement, whereby partial vacuum can be produced in the sealing area D. The motors 26, 52 and 63 are connected to a joint control system 67.

The mode of operation of the dough divider will be described below. Dough is fed from above through the charging hole 12 into the hopper 4. The pistons 15 move in a direction of insertion 68, driven by the motor 26, the belt drive 25, via the cam disk 24, the driving rod 22, the lever arm 21 and the lever 29. FIG. 1 illustrates the pistons 15 in a position A of maximal extension of the front end of the piston 15. Subsequently, the piston 15 moves through the dough on the hopper bottom 5 towards the position B directly at the beginning of the dough channel 28. Part of the dough can escape upwards. Then the piston 15 is inserted into the respective channel 28 as far as to a position C, with a certain metered quantity of dough being in front of the front end 69 of the piston 15. The dividing wall 18, which terminates upstream of the end of the channel 28, provides for pressure compensation of the inserted quantity of dough over the full width of the dough channel 28. Upon insertion of the pistons 15 from the position B to position C, the measuring pistons 41 are simultaneously retracted, whereby the dough is pushed and sucked into the side by side piston casings 43. A decision on whether insertion or suction will predominate takes place in dependence on the kind of dough. Pure insertion may take place as well as substantially pure suction. For retraction of the measuring pistons 41, the motor 52 pivots the pinion 54 and thus the gearwheels 55 and 56, whereby the drive shaft 47 is pivoted. The locking pins 49 of the entrainer 45, which connected to the measuring piston 41, are in engagement with the groove 51 so that pivoting the shaft 47 will lead to the measuring piston 41 being displaced linearly. By means of the individually triggered locking units 50, individual measuring pistons 41 can be coupled to the shaft 47 if not all the measuring pistons 41 are needed. So as to make sure that the measuring pistons 41 are not actuated by the friction between the shaft 47 and entrainer 45, the measuring pistons 41 that are not needed are arrested by an arresting pin 57. The quantity of dough pushed into the piston casing 43 can be regulated by the pivoting angle of the shaft 47 and the depth, linked thereto, of insertion of the measuring piston 41. This is attained by the servomotor 51 in accordance with instructions by the control unit 67. Owing to the partial vacuum, delivered by the connecting sleeve 66, in the sealing area D between the sealing plate 31 and the outer end of the piston casings 42 and 43, the air is sucked off that is included upon metering.

After the piston casings 43 have been filled with the desired quantity of dough, the casing 33 is displaced downwards, guided by the guide rods 34, and driven by the motor 63, the belt drive 62, via the cam disk 61 and the telescopic rod 60, until the outer end of the piston casings 43 reaches the right end 70 of the conveyor belt 8. Then the motor 52 is set rotating in an opposite direction, whereby the measuring pistons 41 push the individual dough pieces on the conveyor belt 8. The conveyor belt 8 feeds the dough pieces to the kneader 9 where they are kneaded. Afterwards the dough pieces are put on the discharge belt 10 and discharged outwards. After the piston casings 43 have been emptied, the casing 33 is again moved into the position seen in FIG. 1 and a re-filling job starts.

If dough portions of smaller size are to be metered, the piston-cylinder unit 64 is triggered by the control system 67 and the length of the telescopic rod 60 is reduced until the piston casings 42 find themselves before the orifice of the dough channel 28. Filling the casings 42 takes place in the same way as filling the piston casings 43. The measuring pistons 40 too offer the possibility of being selectively coupled to the drive shaft 46, there being no forcible displacement of all the measuring pistons 40 upon operation. The option of whether to fill the row of measuring pistons 40 or of measuring pistons 41 can be pre-selected by an operator by way of the control system 67. Further rows of measuring pistons may be provided, for instance three rows of measuring pistons one on top of the other, if an even greater range of dough-piece weight is to be covered. The varying diameters of the piston casings 42 and 43 and the varying depth of insertion therein of the measuring pistons 40 and 41 enable a range of weight per dough piece to be covered that ranges from 30 g to 350 . This interval can still be widened. It is further possible to provided more than eight measuring pistons, for example 12 measuring pistons, side by side. Eight measuring pistons per row and a frequency of 3000 strokes per hour will give a production of 24,000 pieces per hour. Twelve measuring pistons per row will even give a production of 36,000 pieces per hour. The throughput can be reduced at will by the possibility of selectively inactivating individual measuring pistons 40 and 41 in accordance with an operator's instructions. The design of the dividing arrangement is of special importance, the divider being formed by cooperation of the cutter plate 58 and the sealing plate 31. The ground stainless steel cutter plate 58 runs without play in direct contact with the sealing plate 31 of plastic material which is replaceable and thus easy to renew. Unlike a metal sealing plate, no play is needed so that a much better sealing effect is attained, minimizing the dough that might escape within the sealing section D.

The invention claimed is:
1. A dough divider, comprising
   a. a machine housing (3);
   b. a dough collecting container (4) which is mounted on the machine housing (3), receiving dough that is to be metered;
   c. a dough delivery arrangement (6) which is connected to the dough collecting container (4), having at least one driven delivery piston (15) for delivering of dough from the dough collecting container (4); and
   d. a dough metering arrangement (7),
      i. which comprises a first row of first measuring pistons (40), which are displaceably driven in first piston casings (42), taking dough from the dough delivery arrangement (6), and
      ii. at least a second row of second measuring pistons (41), which are displaceably driven in second piston casings (43), taking dough from the dough delivery arrangement (6), said at least one second row of second measuring pistons (41) being disposed underneath said at least one first row of first measuring pistons (40),
  iii. the first piston casings (42) having a cross-sectional area $A_1$ and the second piston casings (43) having a cross-sectional area $A_2$ so that $A_1$ differs from $A_2$;
e. the dough metering arrangement (7) being displaceable such that dough is deliverable by the at least one delivery piston (15) alternatively to the first piston casings (42) or to the at least second piston casings (43); and
f. a dough discharge arrangement for receiving and discharging metered dough from the dough metering arrangement (7), wherein the dough metering arrangement (7) comprises a cutter plate (58) of stainless steel, which is connected thereto, cooperating with a sealing plate (31) of plastic material, which is replaceably connected to the dough collecting container (4).

2. A dough divider according to claim 1, characterized in that the first piston casings (42) and the second piston casings (43) have a circular cross-section of a first diameter $D_1$ and a second diameter $D_2$, respectively.

3. A dough divider according to claim 2, characterized in that $D_1 < D_2$ applies to the diameters.

4. A dough divider according to claim 1, characterized in that several piston casings are disposed in the first row and/or in the second row.

5. A dough divider according to claim 1, characterized in that the dough metering arrangement (7) comprises a casing (33) that is guided for vertical displacement.

6. A dough divider according to claim 5, characterized in that the casing (33) is displaceable vertically up and down by a cam drive.

7. A dough divider according to claim 6, characterized in that the casing (33) is connected to the cam drive via an adjustable-length telescopic rod (60).

8. A dough divider according to claim 1, characterized in that the dough metering arrangement (7) comprises a drive with associated drive shafts (46, 47).

9. A dough divider according to claim 8, characterized in that the first measuring pistons (40) and the second measuring pistons (41) are selectively engageable with one of the drive shafts for torque transmission.

* * * * *